US007958060B1

United States Patent
Miner

(10) Patent No.: US 7,958,060 B1
(45) Date of Patent: Jun. 7, 2011

(54) BUSINESS METHOD FOR GIVING AND TRACKING GIFTS

(76) Inventor: Michael Andrew Miner, White Salmon, WA (US)

( * ) Notice: Subject to any disclaimer, the term of this patent is extended or adjusted under 35 U.S.C. 154(b) by 2740 days.

(21) Appl. No.: 10/677,677

(22) Filed: Oct. 2, 2003

Related U.S. Application Data

(60) Provisional application No. 60/416,469, filed on Oct. 7, 2002.

(51) Int. Cl.
*G06Q 30/00* (2006.01)
(52) U.S. Cl. .......................... 705/333; 705/1.1; 705/28
(58) Field of Classification Search .................. 705/1
See application file for complete search history.

(56) References Cited

U.S. PATENT DOCUMENTS

| 5,392,983 | A | * | 2/1995 | Clarke-Bolling et al. . | 229/87.19 |
| 5,869,819 | A | * | 2/1999 | Knowles et al. ............. | 235/375 |
| 6,394,354 | B1 | * | 5/2002 | Wilz et al. ................ | 235/472.01 |
| 6,433,732 | B1 | * | 8/2002 | Dutta et al. .............. | 342/357.07 |
| 6,976,007 | B1 | * | 12/2005 | Boucher et al. ................. | 705/28 |
| 2001/0056372 | A1 | * | 12/2001 | Rogan et al. ..................... | 705/14 |
| 2006/0119471 | A1 | * | 6/2006 | Rudolph et al. ........... | 340/10.41 |

OTHER PUBLICATIONS wheresgeorge.com web site—before 2002- 3 pgs from site.

* cited by examiner

*Primary Examiner* — F. Ryan Zeender
*Assistant Examiner* — Faris Almatrahi

(57) ABSTRACT

A business method for distributing gifts. The method employs a gift wrap which is marked with a specific code number. The wrap is sold by an originator to a customer who places a gift within the wrap and mails or delivers the package to a first recipient. The customer inputs to the originator's website information comprising the wrap's code number, his name and address and the name and address of the first recipient. Then the first recipient inputs to the website information comprising the code number, his name and address and the name and address of any other recipient to whom the same wrap is sent with another gift. The information is sorted and stored in a database. The customer and first and any subsequent recipient of a wrap access the website over the internet to view the track history of the wrap.

1 Claim, 2 Drawing Sheets

_US 7,958,060 B1_

BUSINESS METHOD FOR GIVING AND TRACKING GIFTS

CROSS-REFERENCE TO PRIOR APPLICATION

This application claims the benefit under 35 USC §119(e) of U.S. provisional application Ser. No. 60/416,469 filed Oct. 7, 2002.

BACKGROUND OF THE INVENTION

1. Field of the Invention

This invention relates to methods for the giving and distribution of gifts.

2. Description of the Related Art

For gift giving, sheets or rolls of wrapping materials such as paper or plastic are used to package the gift. The conventional wrapping materials are disposable rather than reusable because to open a gift the recipient typically tears or cuts the wrap away. This results in the material being unsuitable for reuse. The torn or cut wrapping material is then discarded into the trash which is eventually deposited into a local dump, landfill or disposal area.

As a consequence, conventional methods of giving gifts leads to waste and has a negative impact on the environment.

The need has therefore been recognized for a business method which obviates the foregoing and other limitations and disadvantages of prior art gifting methods. Despite the various business methods in the prior art, there has heretofore not been provided a suitable and attractive solution to these problems.

OBJECTS OF THE INVENTION

It is an object of this invention to provide a new business method for distributing gifts.

Another object is to provide a gift distribution business method which employs a reusable wrap that can hold various gifts enabling the wrap to be distributed in chain fashion to a number of recipients.

Another object is to provide a gift distribution business method employing a reusable gift wrap such as fabric or paper gift bags, gift boxes or gift assemblies which display designs that enhance the presentation of, protect or conceal a gift.

Another object is to provide a gift distribution business method in which the gift wrap carries a unique alphanumeric identification number which is used in combination with a tracking system by which customers and gift recipients may record and track movement of the wrap through the chain of gift transfers.

DESCRIPTION OF THE PREFERRED EMBODIMENTS

Figure 1:
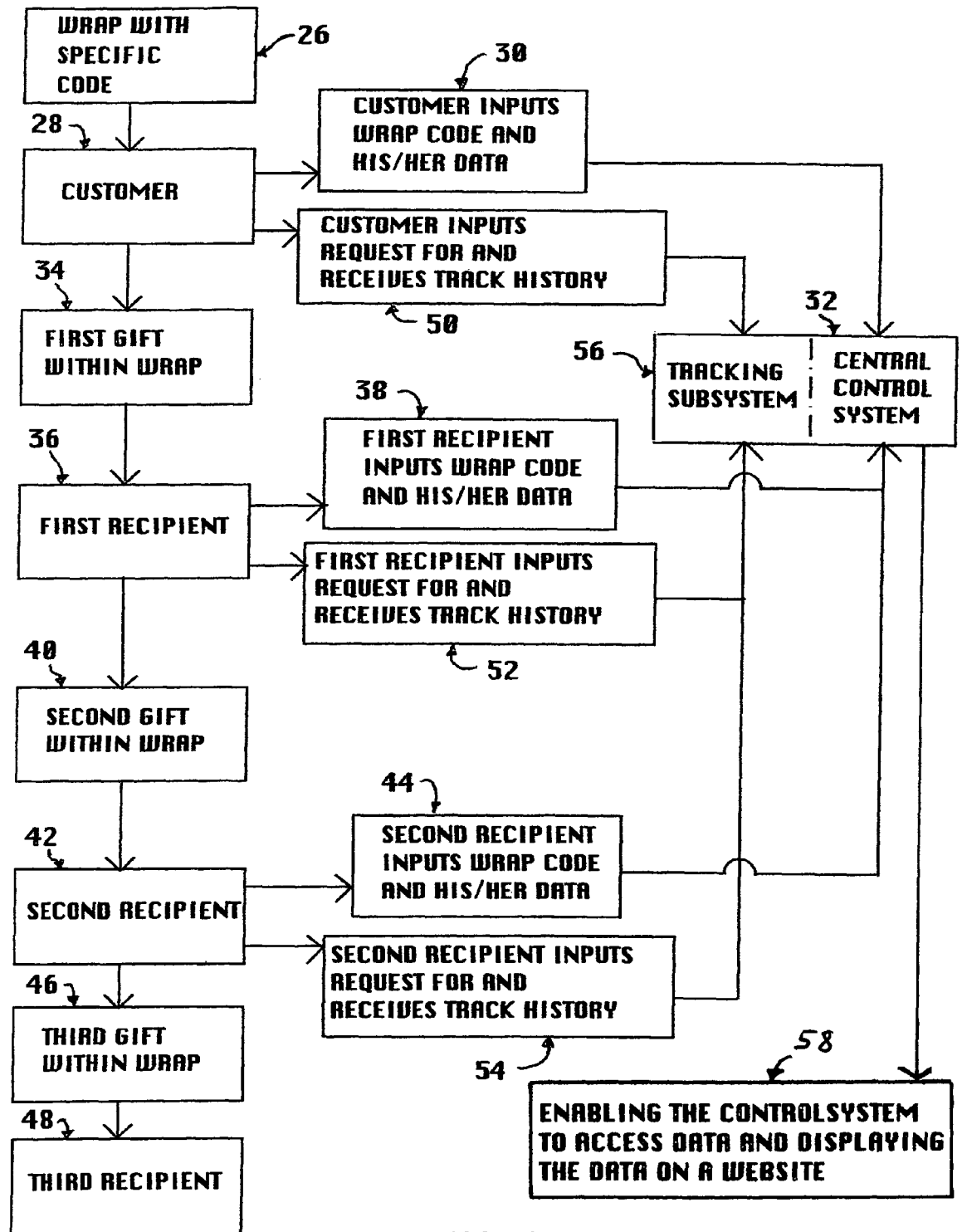
FIG. 1 is a flow chart showing business method steps in accordance with one embodiment of the invention.
Figure 2:
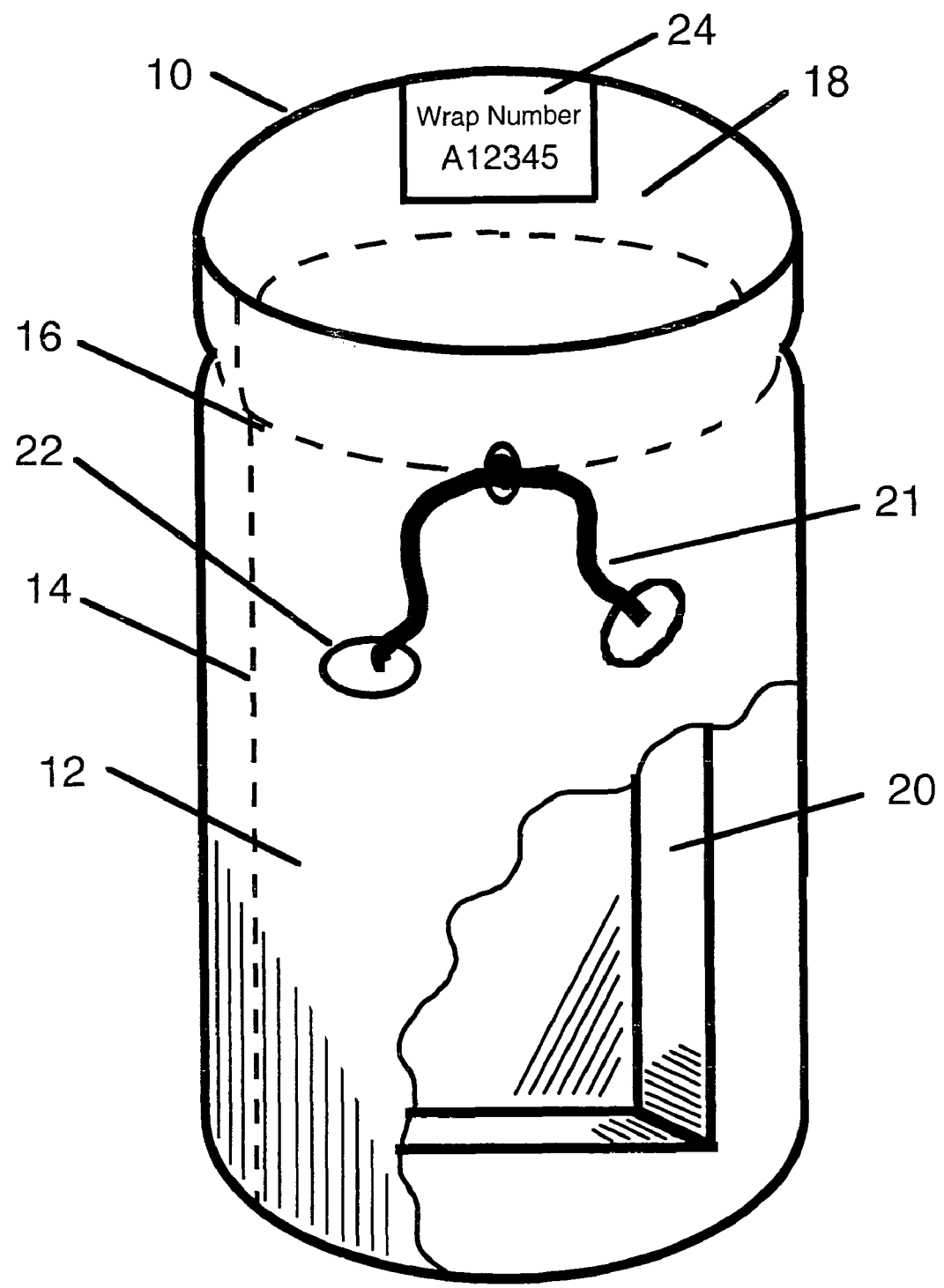
FIG. 2 is a partially cut-away perspective view of a reusable gift wrap for use in the method of FIG. 1.

The invention comprises the business method which in general is carried out by the steps shown by the flow chart of FIG. 1. The method employs a reusable gift wrap 10 as shown in FIG. 2. The wrap 10 is comprised of a bag 12 made of a suitable flexible and durable fabric material, such as cotton, linen, silk, plastic or polyester or blends thereof, or a flexible and durable paper or plastic material. Flexibility of the bag enables the wrap to hold gifts that are within a range of different sizes and shapes.

Fabric bag 12 has edges that are sewn or otherwise joined along a lengthwise seam 14. A hem 16 is sewn around the top end of the bag to form an opening 18. The opening enables ingress and egress of a desired gift, which for example is shown as a box 20. A suitable closure for the opening is provided, such as the illustrated drawcord 21 which is trained through the inside of the hem. Fingerhold discs 22 are secured to opposite ends of the drawcord. The drawcord can be manually drawn tight with its ends tied together for securing the gift within the bag.

The wraps can be produced in a variety of colors and print designs. The design and colors can be different for each wrap. Thus the unique appearance of each wrap will provide added interest and novelty to the users.

A label 24 is sewn or otherwise secured to the inside of hem 16. The label is marked with an identifying code such as the illustrated alphanumeric characters "A12345," as an example. The indicia can be unique for each wrap in the case where they are sold to individual customers who would put a gift into a wrap and then mail or hand it to a recipient. The same identifying code could be used on a number of bags in the case where the customer comprises a related group of people who would be gift givers, such as members of a social or athletic club, or a group of company employees. The code could also be applied to the wrap by printing or stamping the number either directly onto the wrap or onto a tag, sticker, card or other material that is affixed to the wrap.

The code is related to individual wraps, or a related group of wraps, so that each gift transfer can be recorded by the users. The users would comprise gift givers and gift recipients who, after receiving a wrap, would be instructed, such as by a printed sheet or card accompanying the wrap, to send data via the internet into a database on the originator's web site. The type of such data comprises any or all of the following: 1) the name, nickname or pseudonym of the person or group sending the gift; 2.) the name, nickname or pseudonym of the person or group receiving the gift; 3) the gift giving occasion (e.g. birthday); 4) the date of the gift giving occasion; 5) a description of the gift; 6) location of the gift giver; 7) location of the gift receiver; 8) a profile of the gift giver, including gender, age, address, password, email address, etc.; 9) a profile of the gift receiver, including gender, age, address, password, email address, etc., and 10) a desired goal that is entered by the initial user, such as having the wrap visit a certain number of states or a particular person, such as a celebrity. Customers can also give the wraps special "pet" names, such as "Bag-O-Cheer," for entering into the data. These names remain in the database associated with the particular wrap for subsequent display, such as in the Leader Board web page, as explained below.

FIG. 1 shows the steps which carry out the general business method of the invention. In step 26 the originator, which could be the wrap manufacturer, mail order business, dealer or retail shop, provides a wrap which is marked with a specific identification or I.D. code. The wrap is then sold or otherwise transferred by the originator to a customer at step 28. The wrap comes with the printed instructions described above. Following those instructions the customer, as well as subsequent recipients, input (at step 30) the wrap code and the recipients data, as described above, into the originator's website. The website address is also included in the printed instructions. That website transfers the input into a central control system (step 32). The central control system preferably is comprised of a computer having software that is suitably programed to process the incoming data and wrap codes, which are then sorted and stored in a memory database. The program sorts the information by listing data with the specific I.D. code. for the customer and various recipients that are in the chain through which the wrap bearing that specific code is transferred. The system displays back to the person his or her assigned I. D. code for future use.

The control system generates two profiles: 1) a profile for all customers and recipients who input data, and 2) a profile of the data that is inputted for each wrap.

In another embodiment, label 24 of each wrap has an embedded Global Positioning Satellite (GPS) chip. not shown, of a conventional type which receives signals transmitted from satellites, calculates the instantaneous geographic location of the chip of each wrap, and then radiates emf location signals. Central control system 32 receives the location signals and produces and stores in its database a track history of the route traveled by the chip, and therefore by the wrap. This track history can then accessed and read by each customer and recipient with whom the wrap has been associated.

Next at step 34 the customer places a desired gift (first gift in the method) within the wrap, and then mails or hands it to the intended person (first recipient in the method) at step 36. This recipient is also given the same instructions on inputting to the website the code as well that recipient's data at step 38. The customer initially has the privilege of entering the name, and optionally a goal, for the wrap he or she purchases from the originator. The computer of central control system 32 is programmed to continue to function in the event that a recipient for a particular wrap may not enter data. In that event the wrap can subsequently be tracked even though the chain is broken.

At step 40 the first recipient similarly places a gift (second gift in the method) into the same wrap and mails or hands it to the intended person (second recipient in the method) at step 42. The second recipient then inputs at step 44 the wraps' code into the website along with that recipient's data. The chain can be lengthened by transfer of the wrap with additional gifts to a third and any number of subsequent recipients as represented by steps 46 and 48.

At any time after either the customer or recipients input the wrap codes and their data into the control system they can access the stored information from the computer database. This is accomplished by their inputting via the website at steps 50, 52 and 54 requests into a tracking subsystem 56 of the computer for the track history of the particular wrap which they have gifted or received. In doing so they would input the user's I. D. code, and the control system then processes the request and interactively transmits the associated data back for display on the website where it is displayed to the user. The display could comprise a geographic map, such as that of the United States, upon which the wrap's geographic travel history is depicted. At step 58 the control system accesses data and displays the data on the website.

The database will summarize information about each numbered gift wrap. It can show the geographic travels of the gift wrap, the number of times that the gift wrap has been reused, the amount of disposable gift wrap that has been saved, the various contents of the gift wrap, etc. The information also enables the display of the track history of all gift wrap associated with a particular user. For instance, this would include the number of gift wraps that the user has entered into the system and the current whereabouts of those gift wraps. The data which appears on the website is updated periodically, such as every hour.

On the website a number of different site pages are presented for viewing. A home page is provided which links to: 1) a "Wrapsacks" page listing the prices of different wraps and information for customers to place orders; 2) a "Contact Us" page enabling an existing or potential customer to directly contact the originator; 3) a "Be A Dealer" page for those seeking to act as a dealer for originator; and 4) a "Track-a-Sack" page for users to obtain the track history for the wraps they have used. From the Track-a-Sack page a user can link to: 1) a "Give a Sack" page on which the users who transfer the wrap with a gift can enter the wrap code and their data as well as the name and address of the person they are gifting, what they gave, and why they gave it, such as for a birthday or wedding; 2) a "Receive a Sack" page where new recipients of wraps can enter the wrap code and their data; and 3) a "Leader Board" page which displays the "pet" names and customer names of the top number of wraps ranked according to the number of times the wrap has been transferred and the total distance it has traveled throughout the chain of transfers. This page can also display the rankings of the top number of reusers of wraps.

A convenient feature for users is that of gift reminders. Gift reminders can originate when a user inputs to the web site that he/she is giving a gift. Dialog boxes appearing on the site ask the user if he/she would like to be reminded of a gifting occasion, such as the birthday of a friend or relative, the following year. If the gift giver elects to receive such a reminder, the system will automatically generate and send an email in advance of the occasion. The email may include the name of the friend, the gift giving occasion, the date of the occasion and the item gifted the previous year. For example, if a person enters that he or she is giving to their spouse a book for their anniversary on Apr. 3, 2002, then that person will receive an email from the system on say Mar. 20, 2003 as a reminder of the approaching anniversary and advising that a book was given on the previous anniversary.

Another convenient feature for users is that of "thank you" emails. When a user inputs on the web site that he/she has received a gift, then a dialog box appears that gives the user an option of sending a thank you note via email to the gift giver. If the gift giver is a registered user of the web site and has previously input his/her possession of the uniquely numbered wrap, the system knows his/her email address. This allows the system to generate a pre-addressed and even pre-formatted email for the gift receiver's convenience. The gift receiver may also add a personal note into the email.

The code numbers on the wrap may also be referenced to particular characteristics of the gift wrap including the size of the gift wrap, its colors and its print design. For example, medium sized gift bags with a print consisting of blue hearts can be assigned numbers in the range of BHM10000 through BHM10500. In this way, information about the gift wrap itself can be linked with information about the purchaser of the gift wrap since the purchaser's information is contained in the user profile. This allows the originator to determine, for example, that men aged 25-35 prefer to buy gift bags with blue hearts rather than red hearts.

Furthermore, the codes on the gift wrap can be recorded as they are shipped to various retailers so that the originator knows which retailer has which gift bags. This allows the originator to match the information about the retailer with information in the user profile of the purchasing consumer once they register their gift wrap on the web site. A wide variety of conclusions can be drawn from such information. For example, the originator can tell a specific retailer (wholesale customer) that 70% of their gift wrap sales are to women while the same ratio might be 55% for another retailer.

The method may also include game features for added interest and enjoyment by users. One such game involves encouraging a user to have a wrap and gift reach a movie star or other celebrity. The website would explain to a user that a postcard with the user's return address should be placed inside a wrap with a gift that is sent to someone whom the user believes may know the celebrity, or the someone may know somebody else who may know the celebrity. The user would ask the recipient if they could initiate having the wrap, gift and postcard on its way to the celebrity. Then if the wrap ultimately reaches the celebrity, he or she can autograph the postcard and send it back to the user. This chain of transfers to the celebrity would appear on the track history for viewing.

While the foregoing embodiments are at present considered to be preferred it is understood that numerous variations and modifications may be made therein by those skilled in the art and it is intended to cover in the appended claims all such variations and modifications as fall within the true spirit and scope of the invention.

The invention claimed is:

1. A business method for sending a gift within a wrap, the method comprising the steps of applying an identification code to the wrap, giving the wrap to a first user, inputting into a control system a first input of information received from the first user who has transferred the wrap containing one gift to a second user, the first input of information comprising the identification code together with first data provided by the first user, inputting into the control system a second input of information from the second user to which the wrap and the one gift have been transferred, the second input of information comprising the identification code together with second data provided by the second user, employing the control system to access the first and second inputs of information, displaying the first and second data on a website, receiving an other input comprising third data from a third user to whom the wrap and an other gift have been sent, enabling the control system to access the third data, and displaying the third data on the website.

\* \* \* \* \*